Nov. 24, 1970  D. LEIS  3,541,859

DEVICE FOR MEASURING BLOOD PRESSURE IN A VEIN OF A PATIENT

Filed July 19, 1968

INVENTOR.
DIETER LEIS
BY Hane and Baxley
ATTORNEYS

United States Patent Office 3,541,859
Patented Nov. 24, 1970

3,541,859
DEVICE FOR MEASURING BLOOD PRESSURE IN A VEIN OF A PATIENT
Dieter Leis, Erlangen, Germany, assignor to J. Pfrimmer & Co., Erlangen, Germany, a firm of Germany
Filed July 19, 1968, Ser. No. 746,187
Claims priority, application Germany, July 22, 1967, 1,566,140
Int. Cl. G01l 7/20; A16b 5/02
U.S. Cl. 73—402                                     9 Claims

ABSTRACT OF THE DISCLOSURE

A device for adjusting the zero setting of a manometer responsive to the blood pressure in the vein of a patient in conformity with changing anatomical conditions experienced by the patient during treatment in which device two markers are lengthwise slidable along an elongate scale carrier and are jointly moved with a transmission ratio of 2:3, said transmission ratio being based upon the anatomy of the human body.

---

Figure 1:
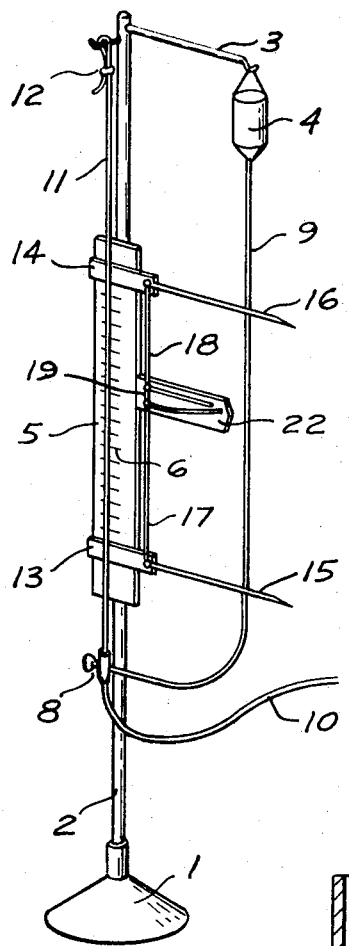

The present invention relates to a device for measuring the central blood pressure in a selected vein of a patient by means of a manometer the zero point setting of which is adjustable in accordance with the specific anatomic conditions of the patient. A control of the zero setting of the manometer is particularly important during the administration of infusions and transfusions. The invention particularly relates to a device of the type in which the manometer includes a straight elongate scale carrier.

In order to obtain sufficiently accurate values it is very important that the zero point of the manometer system is located at the level of the right auricle in the heart of the patient. Such strict requirement as to the location of the zero setting entails that the zero setting of the manometer may have to be readjusted many times during treatment, for instance, when the position of the patient is changed, or the level of a support upon which the patient rests such as an operating table, is changed.

There are known several types of devices for measuring the blood pressure in veins but with the known devices adjustment of the zero point setting is complicated and also inaccurate as the level for which the zero point is to be set must be estimated. With some devices it is also necessary that the hose of the manometer must be re-attached to the scale of the manometer, usually by means of adhesive tape, whenever a re-setting of the zero point becomes necessary. Obviously, repeated re-attachment of the manometer hose tends to introduce errors.

It is also known to measure the blood pressure in veins by means of a glass tube mounted on the scale. With such arrangement the pressure measuring device is displaceable for purpose of adjustment but any adjustment must still be based upon an inherently inaccurate estimation of the presumably correct location of the zero point.

Practical experience and tests show that in practice inaccurate measurements are unavoidable and that such inaccuracies may result in dangerous omissions of an indicated treatment or in a faulty diagnosis. More recent medical investigations have confirmed that an accurate determination of the location of the zero point with reference to which the blood pressure in veins is to be measured, is of great importance. It has also been found that the zero point of a patient lying prone on his back should be located at a height of three-fifths of the diameter of the thorax of the patient.

It is an object of the invention to provide a novel and improved device for determining the correct location of the zero point setting for each patient without having to resort to guesswork.

The afore pointed out objects, features and advantages and other objects, features and advantages which will be pointed out hereinafter, are obtained by providing in a measuring device of the general kind above referred to, two slides from which pointers laterally extend. The slides are coupled by a transmission means such as a gearing in a manner such that the upper slide and the lower slide are displaceable at a transmission ratio of 2:3.

The device of the invention has the advantage that by measuring the diameter of the thorax which can be easily effected, the exact location of the level of the right auricle of the heart of the patient can be accurately ascertained. To set the device, the lower pointer is placed on the scale in alignment with the level of the support surface such as an operating table upon which the patient rests. When now the two pointers are jointly displaced such displacement is automatically at a predetermined relative rate and misadjustments are virtually impossible. If desired, the two slides can be arrested in the selected respective positions by suitable releasable fastening means such as a set screw.

The invention also provides that the two slides of the device are coupled by two links of a linkage system and that the free ends of these links are guided spaced apart from each other by a suitable guide means mounted on the scale carrier at a point intermediate the two slides and that the two links are further coupled by a third link hinged to said free ends of the guided links. In actual practice, the level at which the guide means are mounted, often represents the correct level for the zero point of the manometer. Depending upon the available space, the guide means may be disposed on the same side of a carrier for the scale as the pointers or on the opposite side.

The guide means preferably provide two separate guide slots or tracks, one for each link guided by the same. One of the guide slots may define a simple curve or a rectilinear line while the other guide slot defines a parabolic curve.

A grip or handle may be provided to facilitate manipulation of the linkage system.

The invention also provides a structure in which the two slides are coupled over a gear train supported on the scale carrier and having the required transmission ratio. The movement of one slide is then automatically and positively transmitted to the other side at the selected ratio of 2:3.

Finally, the invention provides a structure in which the two slides are coupled by a spindle rotatably supported on the scale carrier and having at its ends oppositely wound threads with different pitch. The threaded spindle portions are in mesh with the slides via gears which are selected in accordance with the transmission ratio of 2:3.

To facilitate setting of the zero point so that it is accurately located at the level of the support surface for the patient, a sighting device can be provided at the lower pointer.

In the accompanying drawing several preferred embodiments of the invention are shown by way of illustration and not by way of limitation.

Figure 2:
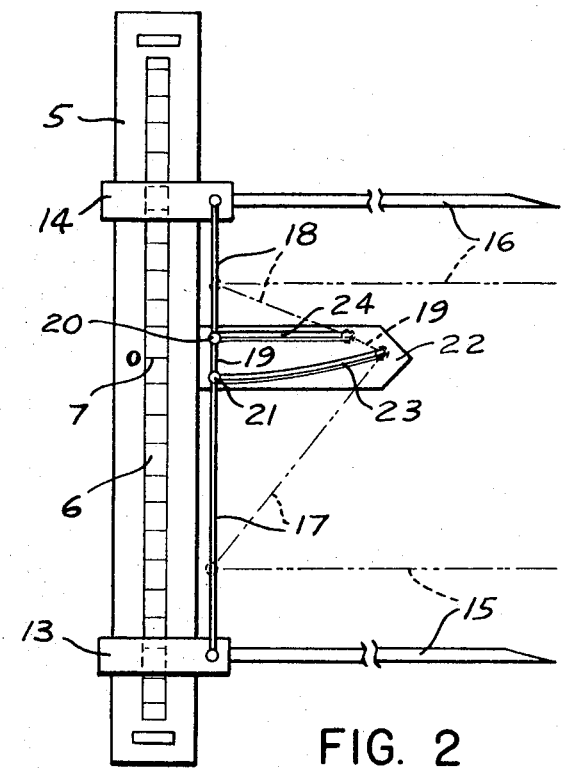
Figure 3:
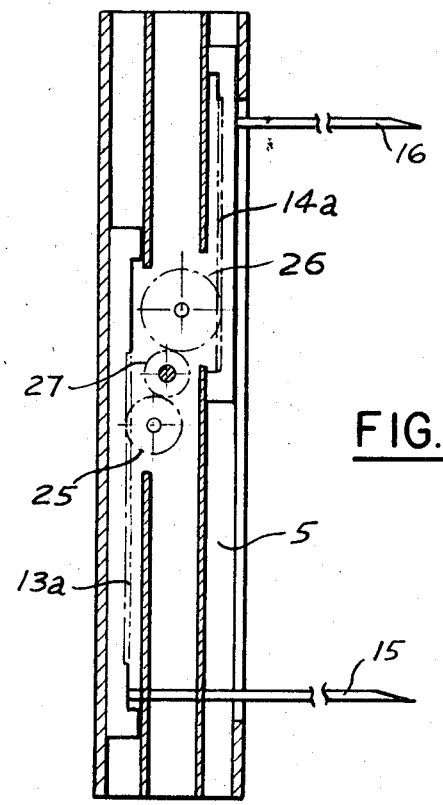

In the drawing:
FIG. 1 is a diagrammatic view of a zero point setting device according to the invention,
FIG. 2 shows the scale carrier and the slide adjustment assembly of the device on an enlarged scale; and
FIG. 3 is a diagrammatic elevational view of a modification of the slide adjustment assembly.

Referring now to the figures more in detail, the device comprises a base 1 supporting a post 2 mounting a bracket 3 supporting by way of example a bottle 4 containing an infusion solution. The post further mounts a scale carrier 5 releasably attached thereto, for instance, by clamps. The forwardly facing side of carrier 5 has calibrated thereon or bears a scale 6 the zero point of which may be located at 7 as shown in FIG. 2. A three-way valve or cock 8 of conventional design is connected to a first hose 9 which extends from the cock to the bottle 4, a second hose 10 which extends to the patient (not shown) and a third hose 11 which ends at 12 in a loop closed off by a suitable closure member such as a cotton stopper. As is clearly shown in FIG. 1, hose 11 which is held taut by the loop extends along the length of the scale.

Scale carrier 5 supports lengthwise slidable thereon two slides 13 and 14 from which pointers or bars 15 and 16 respectively laterally extend. The pointers may be detachably secured to the slides and comprise several telescoped parts.

The two slides and thus the pointers mounted thereon are coupled by a linkage system including links 17, 18 and 19. Link 17 is hinged on one end to slide 15 and guided at its other end 21 in a guide slot or track 23 formed in a bracket 22 detachably secured to the scale carrier, preferably at the level of zero point 7 as is shown. Similarly, link 18 is hinged on one end to slide 14 and is guided on the other end 20 in a second slot or guide track 24 provided on bracket 22. The ends 20 and 21 of the links 17 and 18 are joined by link 19 which is hinged at its ends to the two links 17 and 18.

As is evident, bracket 22 and slots 23 and 24 therein constitute a guide means for the linkage system 17, 18, 19. Guide slot 24 is shown as a straight slot but it may also be curved and guide slot 23 defines a parabolic curve. The configurations of the guide slots and the curvature thereof are so correlated that a displacement of pointer 16 results in a corresponding displacement of pointer 15 at a ratio of 2:3.

FIG. 2 shows in full lines one operational position of pointers 15 and 16 and in dotted lines another operational position thereof.

According to FIG. 3, the slides are in the form of racks 13a and 14a mounting the pointers 15 and 16 and lengthwise slidable along scale carrier 5. The two racks are in mesh with pinions 25 and 26 via an intermediate gear 27 which serves to reverse the direction of the displacement of rack 13a in reference to rack 14a at the ratio of 2:3 when the gear train formed by pinions 25 and 26 and gear 27 is operated.

As is evident, use of gears as transmission means can be varied by using other and conventional types of gear trains, for instance, a spindle can be rotatably mounted on the scale carrier rotatable in reference thereto. The spindle has oppositely threaded end portions of different pitch which are coupled via gears to slides such as the racks of FIG. 3 by suitably dimensioning the gears and the threads so that the desired transmission ratio of 2:3 is obtained.

What is claimed is:

1. A device for setting the zero point location of a manometer means responsive to the blood pressure in a selected vein of a patient in accordance with the existing anatomical conditions of the patient, said device comprising in combination:
   a manometer means having a zero point settable in accordance with the specific anatomic conditions of a patient and including an elongate scale carrier;
   an upper and a lower marker lengthwise slidable on said scale carrier above and below respectively of said zero point; and
   transmission means coupling said markers for joint displacement thereof, said transmission means having a transmission ratio of 2:3.

2. The device according to claim 1 wherein each of said markers comprises a slide displaceable on said scale carrier and a pointer laterally extending from the respective slide.

3. The device according to claim 1 wherein said transmission means comprises a bracket secured to the scale carrier and including an elongate guide means extending substantially laterally of the scale bracket carrier, a first link hinged on one end to one of said markers and guided on the other end by said guide means, a second link hinged on one end to the other marker and guided on the other end by said guide means, and a third link hinged on both ends to the guided ends of the first and the second link, the lengths of said links and said guide means being so correlated that said transmission ratio of 2:3 is obtained.

4. The device according to claim 3 wherein said guide means comprise two substantially parallel tracks on said bracket, each of said tracks being engaged by the guided end of the respective link.

5. The device according to claim 4 wherein the track engaged by the first link is a rectilinear track and the track engaged by the second link is a parabolically curved track.

6. The device according to claim 3 wherein a grip is secured to said third link for manipulating said links.

7. The device according to claim 1 wherein said transmission means comprise a pair of racks supported lengthwise slidable on said scale carrier and each mounting one of said markers, and a gear train in mesh with said racks oppositely displacing the same upon rotation of the gears in said gear train, said gear train displacing said racks at said transmission ratio of 2:3.

8. The device according to claim 1 wherein said transmission means comprise a spindle lengthwise supported on said scale carrier and rotatable about its axis, said spindle having oppositely threaded end portions of different pitch and a rotation reversing gear train in threaded engagement with said markers and said threaded end portions of the spindle, the transmission ratio of the gear train at which the markers are displaced being said 2:3.

9. The device according to claim 1 and comprising sighting means on said lower marker.

References Cited

UNITED STATES PATENTS

| 917,276 | 4/1909 | Faught | 128—2.05 |
| 3,413,970 | 12/1968 | Rockwell | 128—2.05 |

FOREIGN PATENTS

| 1,521,639 | 3/1967 | France. |

RICHARD A. GAUDET, Primary Examiner

J. B. MITCHELL, Assistant Examiner

U.S. Cl. X.R.

128—2.05